(12) United States Patent
Hidaka et al.

(10) Patent No.: US 8,433,183 B2
(45) Date of Patent: Apr. 30, 2013

(54) RECORDING DEVICE AND RECORDING METHOD

(75) Inventors: Yasuhiro Hidaka, Tokyo (JP); Masaaki Kojima, Tokyo (JP); Shingo Yoshioka, Kanagawa (JP); Hidehiko Okumura, Tokyo (JP); Kaname Ogawa, Kanagawa (JP); Hiroki Shiina, Kanagawa (JP)

(73) Assignee: Sony Corporation, Tokyo (JP)

( * ) Notice: Subject to any disclaimer, the term of this patent is extended or adjusted under 35 U.S.C. 154(b) by 1002 days.

(21) Appl. No.: 10/504,994

(22) PCT Filed: Oct. 29, 2003

(86) PCT No.: PCT/JP03/13833
§ 371 (c)(1),
(2), (4) Date: Aug. 18, 2004

(87) PCT Pub. No.: WO2004/057868
PCT Pub. Date: Jul. 8, 2004

(65) Prior Publication Data
US 2005/0083414 A1 Apr. 21, 2005

(30) Foreign Application Priority Data
Dec. 20, 2002 (JP) .............................. P2002-369466

(51) Int. Cl.
*H04N 5/783* (2006.01)
(52) U.S. Cl.
USPC .......................................................... 386/346
(58) Field of Classification Search .................. 386/131, 386/95, 96, 105, 106, 125, 126, 232, 248, 386/328, 329, 332, 333, 343, 344, 346, 348
See application file for complete search history.

(56) References Cited

U.S. PATENT DOCUMENTS

| | | | | |
|---|---|---|---|---|
| 5,140,435 | A * | 8/1992 | Suzuki et al. | 360/72.1 |
| 6,148,140 | A * | 11/2000 | Okada et al. | 386/241 |
| 6,215,746 | B1 * | 4/2001 | Ando et al. | 369/53.2 |
| 6,360,056 | B1 | 3/2002 | Ando et al. | |

(Continued)

FOREIGN PATENT DOCUMENTS

| | | |
|---|---|---|
| EP | 1 498 893 | 1/2005 |
| JP | 5-7356 | 1/1993 |

(Continued)

OTHER PUBLICATIONS

Patent Abstracts of Japan, publication No. 2002-312077 dated Oct. 25, 2002.

*Primary Examiner* — Tat Chio
(74) *Attorney, Agent, or Firm* — Frommer Lawrence & Haug LLP; William S. Frommer

(57) ABSTRACT

A recording apparatus and a recording method that can record both moving picture data and still picture data in a form reproducible by various reproducing apparatus. The moving picture data is compressed by an MPEG system by an MPEG encoder, formed into data for recording corresponding to a predetermined recording format by a format forming unit, and then recorded on a DVD. The still picture data is compressed by a JPEG system by a JPEG encoder, and recorded on the DVD separately from the moving picture data. In predetermined timing, the still picture data compressed by the JPEG system and recorded on the DVD is read, the still picture data is converted into I-pictures of the MPEG system by a format converting unit, and then the I-pictures of the MPEG system are recorded onto the DVD in the predetermined format via the format forming unit.

8 Claims, 8 Drawing Sheets

U.S. PATENT DOCUMENTS

| | | | |
|---|---|---|---|
| 6,483,875 B1 * | 11/2002 | Hasebe et al. | 375/240.15 |
| 6,504,993 B1 * | 1/2003 | Matsumoto | 386/95 |
| 6,553,180 B1 * | 4/2003 | Kikuchi et al. | 386/241 |
| 6,876,612 B2 * | 4/2005 | Yoneyama et al. | 369/47.55 |
| 6,885,623 B1 * | 4/2005 | Oishi et al. | 369/53.37 |
| 2002/0172505 A1 | 11/2002 | Takahash et al. | |

FOREIGN PATENT DOCUMENTS

| | | |
|---|---|---|
| JP | 7 282288 | 10/1995 |
| JP | 2001-203971 | 7/2001 |
| JP | 2002 325227 | 11/2002 |
| JP | 2003-317398 | 11/2003 |

\* cited by examiner

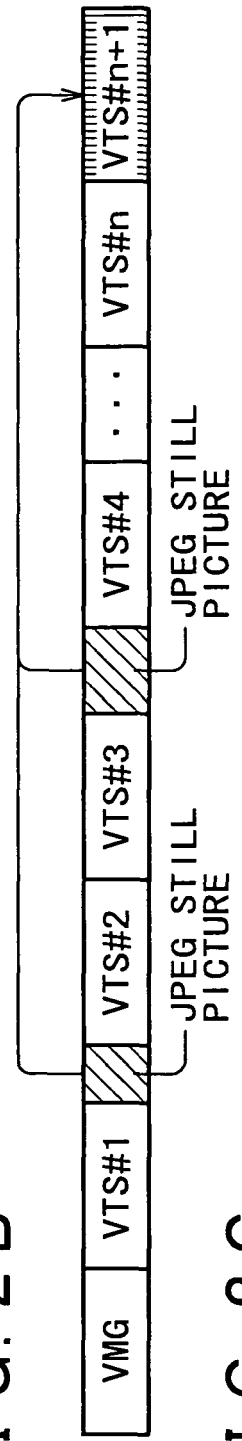
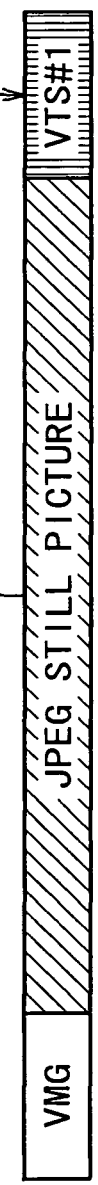
F I G. 2 A
F I G. 2 B
F I G. 2 C

F I G. 7 A
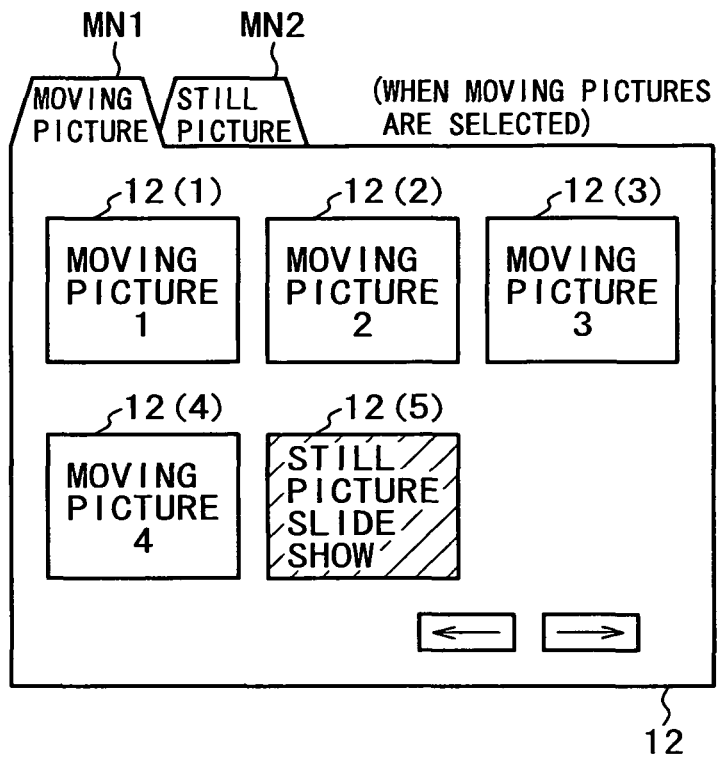
F I G. 7 B
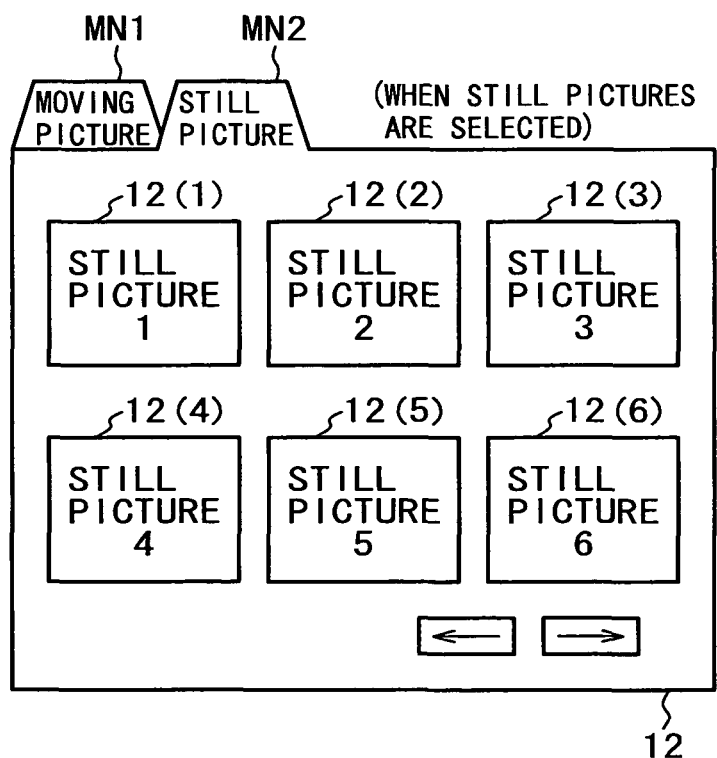

RECORDING DEVICE AND RECORDING METHOD

TECHNICAL FIELD

The present invention relates to a recording apparatus such as a digital video camera, a digital camera or the like that uses for example a recordable DVD (Digital Versatile Disk) or the like as a recording medium and records moving pictures and still pictures as digital data onto the recording medium, and a recording method used in such a recording apparatus.

BACKGROUND ART

Recently, digital video cameras using a large-capacity disk recording medium such as DVD as a recording medium have been considered. There is a high demand for digital video cameras using such a disk recording medium that are capable of recording not only moving pictures but also still pictures separately from the moving pictures and using both the moving pictures and the still pictures.

Conventionally, however, when a moving picture is recorded on a disk medium, the moving picture is recorded in a digital moving picture format devised for moving picture recording, and when a still picture is recorded on the disk medium, the still picture is recorded in a digital still picture format devised for still picture recording. However, recording and reproducing moving pictures and still pictures in the respective different recording formats on the same disk recording medium requires decoders compatible with the respective recording formats.

Taking as an example a case of using DVD as a disk recording medium, when a moving picture is recorded, a digital moving picture format such as DVD Video Format, DVD Video Recording Format or the like using an MPEG (Moving Picture Experts Group) system as a data compression system is used.

When a still picture is recorded, a digital still picture format referred to as JPEG format, DCF (Design rule for Camera File system) format or the like using a JPEG (Joint Photographic Experts Group) system, for example, as a data compression system is used.

Thus, when both moving picture data and still picture data are reproduced from a recording medium on which the moving picture data and the still picture data are recorded in different recording formats in order to obtain the moving picture and the still picture, both a decoder for the moving picture data (MPEG decoder) and a decoder for the still picture data (JPEG decoder) are required.

Hence, when the recording medium on which the moving picture data and the still picture data are recorded in different compression formats is reproduced by a reproducing apparatus including only a decoder for moving pictures, the reproducing apparatus cannot reproduce the still picture data recorded on the recording medium and therefore cannot use the still picture.

It is therefore conceivable that the moving picture data is recorded on the recording medium in the digital moving picture format and that the still picture data is recorded within an MPEG stream using so-called Private Packets defined in the MPEG system or the like so that the still picture data is recorded so as to be mixed in the digital moving picture format.

When the thus recorded still picture data is reproduced, however, a special MPEG decoder that can decode the Private Packets within the MPEG stream as still picture data is required. Therefore, although the need for a still picture decoder is eliminated, a special moving picture decoder capable of decoding Private Packets as still picture data is required, which cannot be said to be a universal solution.

As described in Patent Document 1 (Japanese Patent Laid-Open No. 2002-325227), for example, a system has been devised which creates a recording medium allowing still picture data taken by a digital still camera and recorded on a semiconductor memory or the like in a digital still picture format to be reproduced by, as it were, a general-purpose reproducing apparatus that is not compatible with the digital still picture format.

With the technique described in Patent Document 1, even the still picture data recorded on the recording medium in the digital still picture format can be converted into an I-picture (Intra-Picture) of the MPEG system and then recorded in a digital moving picture format, thus making it possible to create a recording medium allowing the still picture data to be used by a reproducing apparatus having an MPEG decoder.

However, there is a desire for a technique for recording both moving picture data and still picture data onto a recording medium in a form usable by various reproducing apparatus and recording and reproducing apparatus that general users already have on hand, without purchasing a new recording and reproducing apparatus to which the technique described in Patent Document 1 is applied and which has a function of converting from the digital still picture format to the digital moving picture format.

It is accordingly conceivable that when a still picture is taken by using a digital video camera, still picture data is recorded onto a recording medium in the form of an I-picture of the MPEG system from the beginning. In this case, however, a problem arises as to division of an area for recording moving picture data and an area for recording still picture data in the form of I-pictures so that the still picture data in the form of I-pictures is not mixed with I-pictures of normal moving pictures. It is conceivable that this may cause problems such as increase in complexity of various processing for using and managing the still picture data, a sacrifice to some extent of effective use of the recording medium, and the like.

In addition, resolution of the digital still picture format is generally higher than resolution of the digital moving picture format. Thus, when still pictures are recorded onto a recording medium in the digital moving picture format from the beginning, there is no still picture data in the digital still picture format anywhere, and therefore a reproducing apparatus having a decoder for still picture data in the digital still picture format cannot use still picture data in its original resolution.

Further, as described above, in a case of using DVD as a recording medium, DVD recording formats include the DVD Video Format, the DVD Video Recording Format and the like. In the case of using any of the recording formats, there is a desire to record both moving picture data and still picture data with a minimum limitation.

In view of the above, it is an object of the present invention to eradicate the above problems, and provide a recording apparatus and a recording method that can record both moving picture data and still picture data in a form reproducible by various reproducing apparatus.

DISCLOSURE OF INVENTION

In order to solve the above problems, according to the present invention, there is provided a recording apparatus comprising: reading means for reading, in predetermined timing, one or more pieces of digital still picture data recorded in a digital still picture format on a predetermined recording medium; converting means for converting the one or more pieces of digital still picture data from the reading means into data for recording in accordance with a digital moving picture format so as to combine the one or more pieces of digital still picture data; and recording means for recording the data for recording formed by the converting means onto the recording medium.

According to the recording apparatus in accordance with the present invention, one or more pieces of digital still picture data recorded in a digital still picture format on a predetermined recording medium are read in predetermined timing, the one or more pieces of digital still picture data are combined and converted into data in a digital moving picture format by the converting means, and the data is recorded by the recording means onto the same recording medium from which the still picture data is read. That is, the still picture data is recorded on the recording medium in both the digital still picture format and the digital moving picture format.

Thereby even a reproducing apparatus having only a decoder for the digital moving picture format can use still pictures recorded on the recording medium. In addition, a reproducing apparatus also having a decoder for the digital still picture format can use still picture data in the digital still picture format as it is, and thus use still pictures of good resolution.

BRIEF DESCRIPTION OF DRAWINGS

FIGS. 2A, 2B, and 2C are diagrams of assistance in explaining recorded states of data in the DVD Video Format.

FIGS. 7A and 7B are diagrams of assistance in explaining examples of screen display when desired picture data is selected.

BEST MODE FOR CARRYING OUT THE INVENTION

An embodiment of the present invention will hereinafter be described with reference to the drawings. The embodiment below will be described by taking as an example a case where a recording apparatus and a recording method according to the present invention are applied to a DVD digital video camera (hereinafter referred to as a DVD video camera) using a writable DVD as a recording medium.

[Configuration and Operation of DVD Video Camera]

Figure 1:
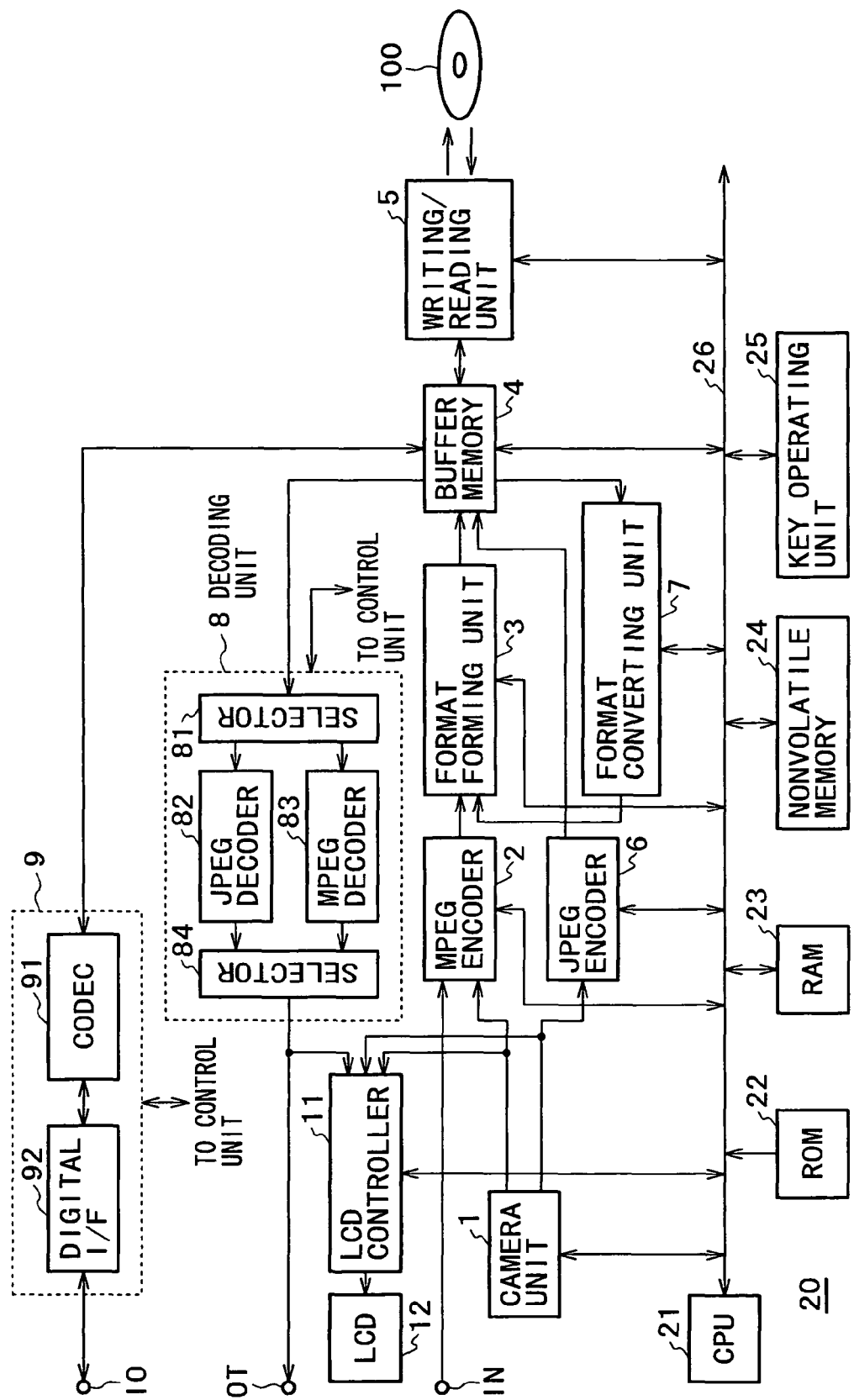
FIG. 1 is a block diagram of assistance in explaining a DVD video camera to which an embodiment of a recording apparatus and a recording method according to the present invention is applied.

FIG. 1 is a block diagram of assistance in explaining an example of configuration of a DVD video camera according to the present embodiment. A DVD 100 in FIG. 1 is a recording medium that is loaded into the DVD video camera according to the present embodiment and onto which moving picture data and still picture data are recorded.

As will be described later, the DVD video camera according to the present embodiment is compatible with both of two digital moving picture formats, that is, the DVD Video format and the DVD Video Recording Format.

Thus, according to an instruction from a user, the DVD video camera according to the present embodiment can format a writable DVD loaded into the DVD video camera into the DVD Video Format or the DVD Video Recording Format, and then use the writable DVD.

As shown in FIG. 1, the DVD video camera according to the present embodiment includes: a recording processing unit comprising a camera unit 1, an MPEG encoder 2, a format forming unit 3, a JPEG encoder 6, and a format converting unit 7; a buffer memory 4 used at a time of recording and at a time of reproduction; and a writing/reading unit 5 used at the time of recording and at the time of reproduction.

As shown in FIG. 1, the DVD video camera according to the present embodiment further includes: a decoding unit 8 used at the time of reproduction, which unit comprises selectors 81 and 84, a JPEG decoder 82, and an MPEG decoder 83; and a digital input-output unit 9 for exchanging digital data, which unit comprises a codec 91 and a digital interface (hereinafter abbreviated to a digital I/F) 92.

As shown in FIG. 1, the digital input-output unit 9 is connected to a digital input-output terminal IO to enable exchange of digital data with another apparatus through the digital input-output terminal. In addition, information such as picture information and the like that is decoded and D/A-converted by the decoding unit 8 can be outputted through an analog output terminal OT to be supplied to an external apparatus such as a monitor receiver or the like.

An analog video signal and an analog audio signal from an external apparatus are inputted to the MPEG encoder 2 through an input terminal IN. The analog video signal and the analog audio signal are A/D-converted and compressed into data of an MPEG system by the MPEG encoder 2, and then the data is recorded onto the DVD 100.

The DVD video camera according to the present embodiment is further provided with an LCD (Liquid Crystal Display) controller 11 and an LCD 12. A picture being captured by the camera unit 1 or a picture reproduced from picture data recorded on the DVD 100 is displayed on the LCD 12 to allow the user to view the picture. Incidentally, though not shown in the figure, a viewfinder for viewing a picture being captured by the camera unit 1 can be provided to the DVD video camera.

A control unit 20 in FIG. 1 controls the parts described above. The control unit 20 is a microcomputer formed by connecting a CPU (Central Processing Unit) 21, a ROM (Read Only Memory) 22, a RAM (Random Access Memory) 23, and a nonvolatile memory 24 to one another through a CPU bus 26.

Data necessary for various programs and processing to be executed by the CPU 21 of the control unit 20 are recorded in the ROM 22. The RAM 23 is mainly used as a work area for temporarily storing results of processing in progress and the like. The nonvolatile memory 24 can retain information stored therein even after power is shut down. The nonvolatile memory 24 is to store and retain various setting parameters, results in progress desired to be retained reliably, and the like.

In addition, the control unit 20 is connected with a key operating unit 25 having various operating keys, operating knobs and the like. Various instruction inputs from the user can be inputted to the DVD video camera through the key operating unit 25. Information corresponding to an instruction input received from the user through the key operating unit 25 is supplied as an electric signal to the control unit 20. Thereby the control unit 20 controls parts according to the instruction from the user so that the DVD video camera can perform an operation corresponding to the instruction from the user.

[Operation in Recording Moving Picture]

As described below, the DVD video camera according to the present embodiment can take a picture as a moving picture and record the picture on the DVD, and take a picture as a still picture and record the picture on the DVD.

Specifically, the camera unit 1 of the DVD video camera according to the present embodiment has a CCD (Charge Coupled Device) and an electronic shutter function. The user of the DVD video camera according to the present embodiment operates a predetermined operating key of the key operating unit 25 to bring the DVD video camera according to the present embodiment into a standby state in which the DVD video camera according to the present embodiment can start taking a picture at any time, and then operates a picture taking start key (REC key) of the key operating unit 25, whereby an operation is performed to take a picture being captured by the camera unit 1 as a moving picture and record the picture on the DVD 100.

In this case, a moving picture signal from the camera unit 1 is supplied to the MPEG encoder 2. The MPEG encoder 2 subjects the moving picture signal to A/D conversion to convert the moving picture signal into digital moving picture data, then compresses the digital moving picture data by the MPEG system, and supplies the compressed data to the format forming unit 3. Under control of the control unit 20, the format forming unit 3 forms data for recording in accordance with the recording format (digital moving picture format) of the DVD 100 loaded in the DVD video camera according to the present embodiment, and then supplies the data for recording to the buffer memory 4.

The buffer memory 4 is controlled in writing/reading by the control unit 20. At the time of recording, the buffer memory 4 is to make a time-base correction for the data for recording between the DVD video camera according to the present embodiment and the DVD 100 so that all the data for recording can be recorded on the DVD 100 without omission.

The buffer memory 4 is used with a FIFO (First In First Out) system. At the time of recording of the moving picture, the data for recording from the format forming unit 3 is sequentially written to the buffer memory 4, and at the same time, the data for recording already recorded in the buffer memory 4 is read and supplied to the writing/reading unit 5.

The writing/reading unit 5 has an optical pickup, a biaxial actuator, a sled motor and the like, which are not shown in the figure. Under control of the control unit 20, the writing/reading unit 5 records the data for recording at a predetermined position on the DVD 100 loaded in the DVD video camera according to the present embodiment. Thus, the DVD video camera according to the present embodiment can record the moving picture taken via the camera unit 1 as digital data onto the DVD 100 as a recording medium loaded in the DVD video camera.

[Operation in Recording Still Picture]

By bringing the DVD video camera according to the present embodiment into a standby state and operating a shutter key of the key operating unit 25, the DVD video camera according to the present embodiment operates the electronic shutter of the camera unit 1 to take a picture being captured by the camera unit 1 as a still picture and then record the picture onto the DVD 100.

In this case, a still picture signal from the camera unit 1 is supplied to the JPEG encoder 6. The JPEG encoder 6 subjects the still picture signal to A/D conversion to convert the still picture signal into digital still picture data, then compresses the digital still picture data by a JPEG system, and thereby forms data for recording in a JPEG format (digital still picture format). The data for recording from the JPEG encoder 6 is supplied to the writing/reading unit 5 via the buffer memory 4. The writing/reading unit 5 records the data for recording as still picture data onto the DVD 100 loaded in the DVD video camera.

Thus, the DVD video camera according to the present embodiment records moving picture data in the digital moving picture format and still picture data in the digital still picture format at an appropriate position on the DVD 100 as a recording medium at each time of picture taking, whereby the moving picture data and the still picture data can be recorded mixed with each other on the DVD 100. That is, an area for recording moving picture data and an area for recording still picture data do not need to be provided in a state of being divided from each other in advance on the DVD 100 as a recording medium.

Therefore data, regardless of whether it is moving picture data or still picture data, can be recorded efficiently by using storage space of the DVD without wasting the storage space by securing an area for recording still picture data in advance even when no still pictures are taken, for example.

Thus, the DVD video camera according to the present embodiment can compress moving picture data by the MPEG system and record the compressed data onto the DVD in a predetermined digital moving picture format, and compress still picture data by the JPEG system and record the compressed data onto the loaded DVD in the digital still picture format.

[Converting Format of Still Picture Data]

The DVD video camera according to the present embodiment performs processing of reading all still picture data recorded in the digital still picture format on the DVD 100 used for recording, converting the still picture data into data in a digital moving picture format, and then additionally recording the data in the digital moving picture format onto the DVD 100 in timing of response to an instruction from the user or in timing in which the control unit 20 determines that the processing is required at a time of removal of the DVD 100 used for recording, for example.

Specifically, in timing of response to an instruction from the user or in timing in which the control unit 20 determines that the processing is required, the DVD video camera according to the present embodiment reads all still picture data recorded in the digital still picture format on the DVD 100 used for recording via the writing/reading unit 5, and then supplies the still picture data to the format converting unit 7 via the buffer memory 4.

The format converting unit 7 converts the still picture data in the digital still picture format (still picture data compressed by the JPEG system) read from the DVD 100 via the writing/reading unit 5 into data in a form of I-pictures of the MPEG system. Thus, the format converting unit 7 is a so-called JPEG format-I-picture converting unit for converting still picture data that cannot be decoded without a JPEG system decoder into data decodable by an MPEG system decoder.

Then, the still picture data converted into the data in the form of I-pictures of the MPEG system by the format converting unit 7 is supplied to the format forming unit 3. As described above, the format forming unit 3 forms, from the data to be recorded, data for recording in a predetermined digital moving picture format, that is, the DVD Video Format or the DVD Video Recording Format in the present embodiment.

When the still picture data converted into the data in the form of I-pictures of the MPEG system is supplied from the format converting unit 7, the format forming unit 3 combines all the still picture data converted into the data in the form of I-pictures of the MPEG system into one set of data (data for one chapter), and forms data for recording in a predetermined digital moving picture format. The data for recording thus formed is recorded onto the DVD 100 via the buffer memory 4 and the writing/reading unit 5, as described above.

Thus, the DVD video camera according to the present embodiment can for example compress moving picture data obtained by taking a picture by the MPEG system and record the compressed moving picture data in accordance with a predetermined digital moving picture format, and record still picture data obtained by taking a picture in accordance with a predetermined digital still picture format such as the JPEG format.

Further, the DVD video camera according to the present embodiment can convert the still picture data recorded in the digital still picture format into data in the form of I-pictures of the MPEG system, and record the data so as to add the data to the previously recorded moving picture data compressed by the MPEG system and recorded in the predetermined digital moving picture format.

Thus, the DVD video camera according to the present embodiment records the still picture data recorded in the digital still picture format as it is, and further converts the still picture data recorded in the digital still picture format into still picture data in the form of I-pictures of the MPEG system and records the still picture data in a digital moving picture format on the same recording medium.

Thereby, a reproducing apparatus having an MPEG system decoder can reproduce and use both moving pictures and still pictures taken and recorded onto the DVD 100 in a digital moving picture format by the DVD video camera according to the present embodiment, and a reproducing apparatus having a JPEG system decoder can use still picture data in a digital still picture format without a degradation in resolution of the still picture data.

[Processing for Reproducing Recorded Data]

The DVD video camera according to the present embodiment has a reproducing function for reading and reproducing moving picture data and still picture data recorded on the DVD 100 from the DVD 100 loaded in the DVD video camera according to the present embodiment.

When the moving picture data and the still picture data recorded on the DVD 100 loaded in the DVD video camera according to the present embodiment are to be reproduced, the user operates a predetermined operating key of the key operating unit 25 to set the DVD video camera according to the present embodiment in a reproduction mode for reproducing the data from the recording medium and thus bring the DVD video camera according to the present embodiment into a state of being able to read the data from the DVD 100.

In the case of the DVD video camera according to the present embodiment, the control unit 20 receives an instruction input indicating whether to reproduce the moving picture data or to reproduce the still picture data through the key operating unit 25.

When the received instruction input is an instruction to reproduce the moving picture data, the control unit 20 controls the writing/reading unit 5 to irradiate the DVD 100 with a laser beam and receive the reflected light, thereby read moving picture data compressed by the MPEG system and recorded in a predetermined digital moving picture format, and then supply the read moving picture data to the decoding unit 8 via the buffer memory 4.

The buffer memory 4 is used also at the time of reproduction because of an advantage of preventing interruption of reproduced pictures by continuing data reading from the buffer memory 4 even when reading of recorded data from the DVD 100 is temporarily interrupted due to a disturbance such as a vibration, for example.

Under control of the control unit 20, the selectors 81 and 84 in the decoding unit 8 are switched to the MPEG decoder 83 side. The MPEG decoder 83 decodes the moving picture data and the still picture data recorded in the form of I-pictures of the MPEG system, and thereby reconstructs moving picture data and still picture data before data compression. A reproduced picture is displayed on the LCD 12 or supplied to an external apparatus such as the monitor receiver or the like through the output terminal OT so as to reproduce the moving picture data and the still picture data.

When the received instruction input is an instruction to reproduce the still picture data, the control unit 20 controls the writing/reading unit 5 to read the still picture data compressed by JPEG and recorded in the digital still picture format. The control unit 20 switches the selectors 81 and 84 of the decoding unit 8 to the JPEG decoder 82 side to reproduce the still picture data compressed by the JPEG system and recorded.

In this case, since only the still picture data compressed by the JPEG system and recorded is read and decoded by the JPEG decoder 82 for reproduction, still pictures of a higher resolution than that of the MPEG system can be reproduced and used.

Incidentally, as will be described later, the moving picture data is recorded in title units and chapter units so that moving picture reproduction can be performed from a specified title or chapter. As for the still picture data recorded in the form of I-pictures of the MPEG system, a plurality of still pictures can be displayed in a manner of so-called slide show display, in which each of the plurality of still pictures is displayed for a predetermined time.

As described above, the DVD video camera according to the present embodiment is provided with the digital input-output terminal IO and the digital input-output unit 9 to exchange digital data such as digital moving picture data, digital still picture data and the like with an external apparatus such as a personal computer or a DVD recording and reproducing apparatus, for example.

[Processing for Converting Still Picture Data into Different Recording Formats]

Processing for converting still picture data recorded in the digital still picture format into a digital moving picture format will next be described by separately taking a case of using the DVD Video Format and a case of using the DVD Video Recording Format, which formats are usable by the DVD video camera according to the present embodiment as shown in FIG. 1.

[DVD Video Format]

Description will first be made of the case of using the DVD Video Format as a digital moving picture format. As described above, the DVD video camera according to the present embodiment can record moving picture data and still picture data in a mixed manner without dividing in advance an area for recording the moving picture data and an area for recording the still picture data from each other.

FIGS. 2A to 2C are diagrams of assistance in explaining recorded states of data in the DVD Video Format. As shown in FIG. 2A, in the case of the DVD Video Format, moving picture data for one title comprising one or more chapters is recorded continuously as VTS (Video Title Set) information.

In the example shown in FIG. 2A, as indicated by VTS#1, VTS#2, . . . , and VTS#n, moving picture data for n titles is recorded. VMG (Video ManaGer) information is also provided, which is VTS managing information for collectively managing pieces of VTS information to continuously reproduce a plurality of VTSs without an interruption, for example.

In the case of the DVD Video Format, so-called finalizing processing is required in which contents of the above-described VMG are rewritten according to recorded VTSs to thereby enable the DVD to be used as a reproducing disk. When the DVD Video Format is used, processing for recording still picture data recorded in the digital still picture format also in a digital moving picture format is performed in timing of performance of the finalizing processing.

Specifically, the finalizing processing is performed in timing of response to an instruction from a user or in timing of operation to remove the DVD from the DVD video camera according to the present embodiment. At this time, the processing for recording still picture data recorded in the digital still picture format also in a digital moving picture format is performed.

Incidentally, in the present specification, the word "title" refers to one broadcast program in the case of television broadcast, and the word "chapter" refers to each part of one title when the title is divided into a first half and a second half or into a first act, a second act, . . . , for example.

The DVD video camera according to the present embodiment combines moving picture data recorded before the finalizing processing into one title, or combines a set of 99 chapters into one title. Also, the DVD video camera according to the present embodiment treats moving picture data of a moving picture taken between starting and stopping of moving picture taking, that is, between a REC start and a REC stop as one chapter.

When both moving pictures and still pictures are taken, the DVD video camera according to the present embodiment records VTS information having moving picture data recorded therein and still picture data compressed by the JPEG system (hatched parts in FIG. 2B) in a mixed manner on the DVD, as shown in FIG. 2B, for example.

Thereafter, as described above, when an input of an instruction to perform the finalizing processing is received from the user or an instruction to remove the DVD loaded in the DVD video camera and used for recording is given, for example, as indicated by arrows in FIG. 2B, the DVD video camera according to the present embodiment forms still picture data in the form of I-pictures of the MPEG system from still picture data in the digital still picture format compressed by the JPEG system (JPEG still picture data) (performs format conversion processing), combines a plurality (for example 99) of the pictures into one title to form a new VTS#n+1 (performs format formation processing), and records VTS#n+1 on the DVD 100 used for recording.

Thereafter, the finalizing processing is performed to form and update VMG information taking into consideration the newly recorded VTS#n+1 comprising still picture data in the form of the plurality of I-pictures of the MPEG system. Thus, as shown in FIG. 2B, the moving picture data compressed by the MPEG system and recorded in the DVD Video Format as represented by VTS#1 to VTS#n, the still picture data in the form of I-pictures of the MPEG system recorded in the DVD Video Format as represented by VTS#n+1, and the still picture data compressed by the JPEG system are recorded on the DVD used for recording so that each of these pieces of data is usable.

It is of course possible to take and record only still pictures. In this case, as shown in FIG. 2C, still picture data compressed by the JPEG system (hatched parts in FIG. 2C) is recorded on the DVD. Then, in time of the finalizing processing, still picture data in the form of I-pictures of the MPEG system is formed from the still picture data compressed by the JPEG system, a plurality of the pictures are combined to form a new VTS#1, . . . , as shown in FIG. 2C, and VTS#1, . . . are recorded on the DVD used for recording.

Then, the finalizing processing is performed to form and update VMG information taking into consideration the newly recorded VTS#1, . . . Thus, as shown in FIG. 2C, the still picture data taken as still pictures and compressed by the JPEG system (hatched parts in FIG. 2C) and the still picture data in the form of I-pictures of the MPEG system recorded in the DVD Video Format as represented by VTS#1 are recorded on the DVD used for recording so that each of these pieces of data is usable.

Description will next be made of data when JPEG still picture data is converted into I-pictures of the MPEG system and the I-pictures after the conversion are formed into titles and chapters of the DVD Video Format with reference to FIG. 3. For simplicity of description below, a case of using one chapter per still picture and recording three chapters as one title in the DVD Video Format is taken as an example.

Figure 3:
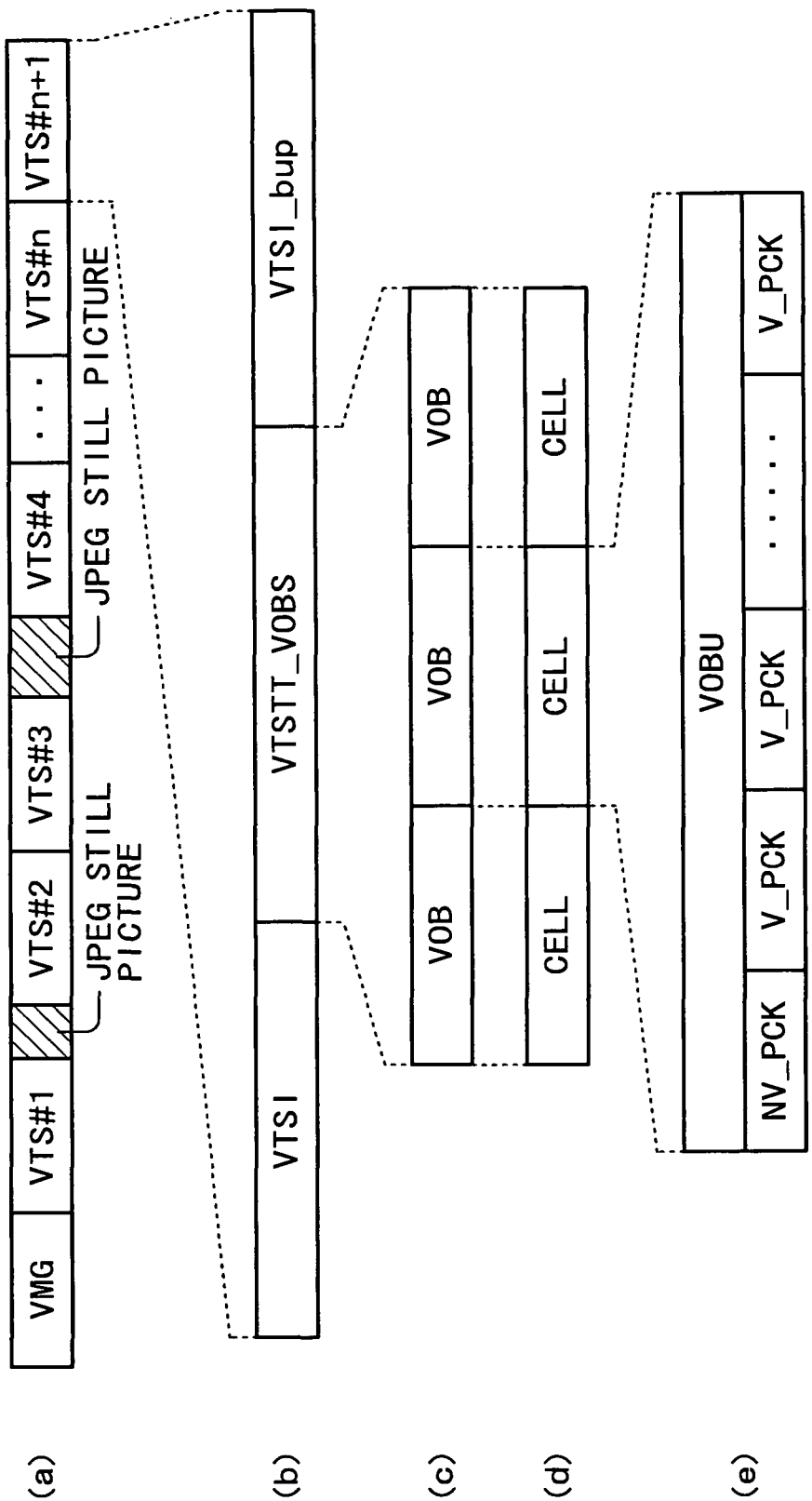
FIG. 3 is a diagram of assistance in explaining recorded states of data in the DVD Video Format.

FIG. 3 is a diagram of the DVD Video Format when the DVD video camera according to the present embodiment records three still pictures (three chapters) as one title on the DVD. FIG. 3(*a*) shows a state in which n titles are recorded before the processing of forming still pictures into a title and chapters, and the still pictures are recorded as an (n+1)th title.

In FIG. 3(*a*), as in FIGS. 2A to 2C, each VTS (Video Title Set) represents one title, and VTS#n represents a VTS having an nth title recorded therein. As in the case described with reference to FIG. 2B, in time of finalizing processing, still picture data in the form of I-pictures of the MPEG system is formed from the JPEG still picture data, a plurality of the pictures (three pictures in the example of FIG. 3) are combined to form VTS#n+1, and VTS#n+1 is recorded on the DVD.

As shown in FIG. 3(*b*), each VTS includes VTSI (Video Title Set Information), VTSTT_VOBS (Video Object Set for Title), and VTSI_bup (Video Title Set Information backup). The VTSTT_VOBS is picture data of chapters included in the title. As shown in FIG. 3(*c*), VOBs (Video Objects) for a plurality of chapters can be present in the VTSTT_VOBS.

The VTSI is managing information for managing the plurality of chapters recorded in the VTSTT_VOBS and allowing the plurality of chapters to be read at any time. The VTSI bup is backup information of the VTSI, and has the same contents as the VTSI.

The original DVD Video Format specifies that a plurality of CELLs can be present in each VOB. In the DVD video camera according to the present embodiment, however, as VOBs in FIG. 3(*c*) are in one-to-one correspondence with CELLs in FIG. 3(*d*), only one CELL can be present in one VOB of at least a VTS in which still pictures in the form of I-pictures of the MPEG system formed from the JPEG still picture data are recorded. That is, a relation 1 VOB=1 CELL=1 chapter holds at all times.

There is an area referred to as Cell Still Time within a CELL. When the CELL is a still picture, the number of seconds for which the CELL (still picture) is to be reproduced can be specified in the Cell Still Time. That is, the number of seconds for which to reproduce the still picture (number of seconds for which to display the still picture) can be set arbitrarily.

Also, in the DVD Video Format, a plurality of VOBUs (Video Object Units) can be present within a CELL. In the DVD video camera according to the present embodiment, however, as shown in FIG. 3(e), the number of VOBUs is limited to one at least in a CELL of a VTS in which still pictures in the form of I-pictures of the MPEG system formed from the JPEG still picture data are recorded.

As shown in FIG. 3(e), a VOBU includes NV_PCK (navigation pack) at a head thereof, followed by a plurality of V_PCKs (video packs). The number of V_PCK packs included in a VOBU is the number of V_PCK packs required for a capacity of one MPEG system I-picture. Incidentally, the NV_PCK includes for example data search information for realizing fast forward, fast reverse, and the like.

Thus, the DVD video camera according to the present embodiment forms still picture data in the form of I-pictures of the MPEG system from still picture data compressed by the JPEG system and then recorded. Then, the DVD video camera according to the present embodiment forms one still picture into one chapter, combines a plurality of still pictures into one title, and records the title on the DVD in accordance with the DVD Video Format as shown in FIG. 3.

In addition, by changing the Cell Still Time of a CELL, it is possible to make an adjustment such as changing reproduction time of a still picture converted into the form of I-pictures of the MPEG system, for example. This adjustment can be made by the user through the key operating unit 25 of the DVD video camera according to the present embodiment. In this case, the adjustment can be made by rewriting street data of information recorded on the DVD through the writing/reading unit 5 by control of the control unit 20. Of course, the adjustment can be made by another DVD recording and reproducing apparatus having an edit function.

Referring to a flowchart of FIG. 4, description will next be made of processing in a case where still picture data compressed by the JPEG system is converted into I-pictures of the MPEG system and the I-pictures of the MPEG system are recorded in the DVD Video Format on a DVD formatted in the DVD Video Format.

Figure 4:
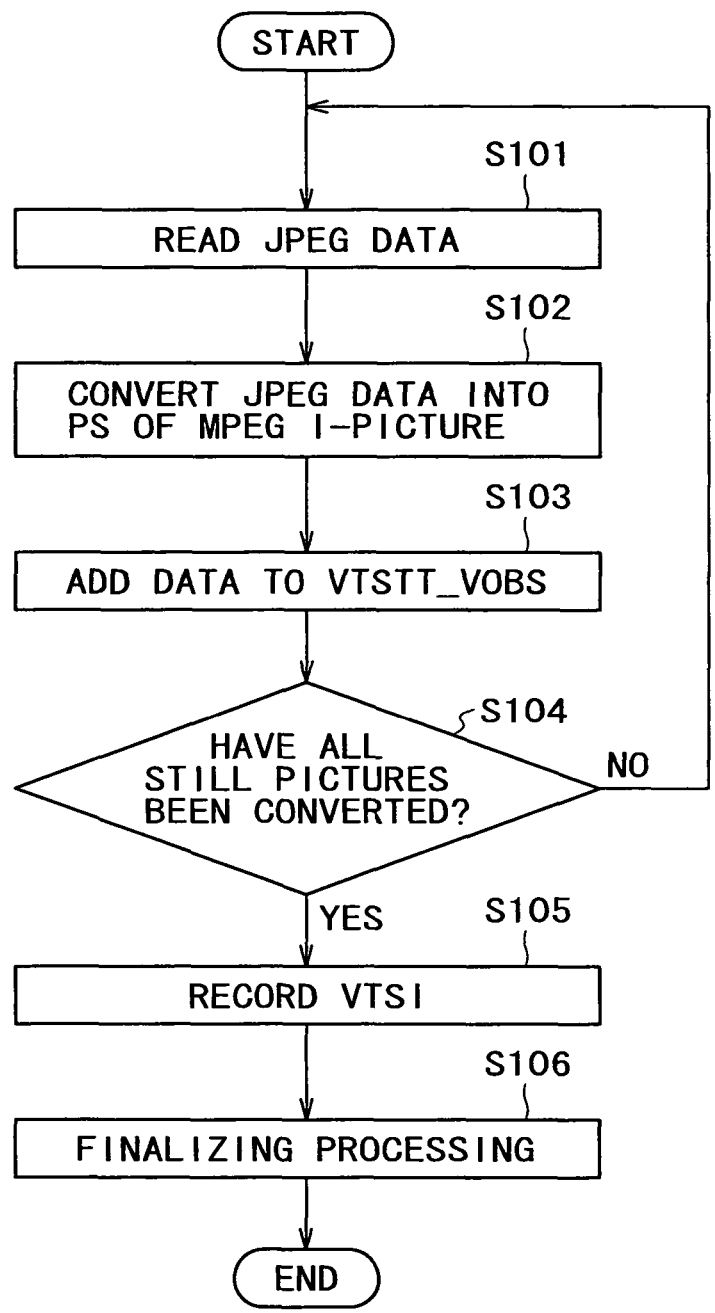
FIG. 4 is a flowchart of assistance in explaining processing in a case where still picture data is converted into I-pictures of the MPEG system and the I-pictures of the MPEG system are recorded in the DVD Video Format.

The processing shown in FIG. 4 is performed in timing of performance of finalizing processing when there is an instruction from the user to perform the finalizing processing or when the DVD used for recording is removed from the DVD video camera, for example.

When the finalizing processing is performed, the control unit 20 controls a DVD rotation driving unit not shown in FIG. 1, the writing/reading unit 5, and the buffer memory 4 to read still picture data compressed by the JPEG system and recorded in the digital still picture format on the DVD 100 used for recording, and then supplies the still picture data to the format converting unit 7 (step S101).

Then, the control unit 20 controls the format converting unit 7 to convert the JPEG still picture data into data (PS: Program Stream) in the form of an I-picture of the MPEG system (step S102). The data is supplied to the format forming unit 3. Under control of the control unit 20, the format forming unit 3 adds the still picture data in the form of the I-picture of the MPEG system supplied thereto to the VTSTT_VOBS of a VTS newly formed for still pictures as shown in FIG. 3, and then the still picture data is recorded onto the DVD via the buffer memory 4 and the writing/reading unit 5 (step S103).

The control unit 20 then determines whether all the JPEG still picture data recorded on the DVD used for recording has been converted into the form of an I-picture of the MPEG system, added to a VTSTT_VOBS, and recorded (step S104). When the control unit 20 determines in the determination processing of step S104 that not all the JPEG still picture data has been recorded, the control unit 20 controls parts as described above to repeat the processing from step S101.

When the control unit 20 determines in the determination processing of step S104 that conversion processing on all the JPEG still picture data has been completed, the control unit 20 forms the VTSI of the newly added VTS, and then records the VTSI onto the DVD via the writing/reading unit 5 (step S105). In the processing of step S105, the recording is performed while the number of seconds for which to reproduce the still pictures converted into I-pictures is set for each still picture in the Cell Still Time of the VTSI.

Incidentally, in this case, the Cell Still Time of the VTSI is set at a value of about three seconds, for example, and recorded. This value can be changed in advance by the user, or can be changed later, as described above.

Then, the control unit 20 performs so-called finalizing processing to form a VMG taking into consideration the VTS newly added for recording of MPEG system still pictures and record the VMG on the DVD through the writing/reading unit 5 (step S106). The processing shown in FIG. 4, or the JPEG format-MPEG I-picture conversion processing and the DVD Video Format finalizing processing are ended.

Incidentally, when for efficiency of management or the like, a maximum number of chapters to be recorded in one title (one VTS) is limited to 99, for example, whether 99 chapters are recorded in one VTS is determined in a stage preceding the determination processing of step S104 shown in FIG. 4. When it is determined that 99 chapters are recorded in one VTS, the VTSI of the VTS is recorded. Then, a new VTS is formed and the processing from S101 is repeated.

Specifically, the number of chapters recordable in one VTS is counted, and when the number of chapters recordable in one VTS is exceeded, a new VTS is formed. Thus, the number of chapters recordable in one title (one VTS) can be restricted. However, assigning a plurality of VTSs for still picture data prevents limitation on the amount of recordable still picture data in the form of I-pictures of the MPEG system.

[DVD Video Recording Format]

Figure 5:
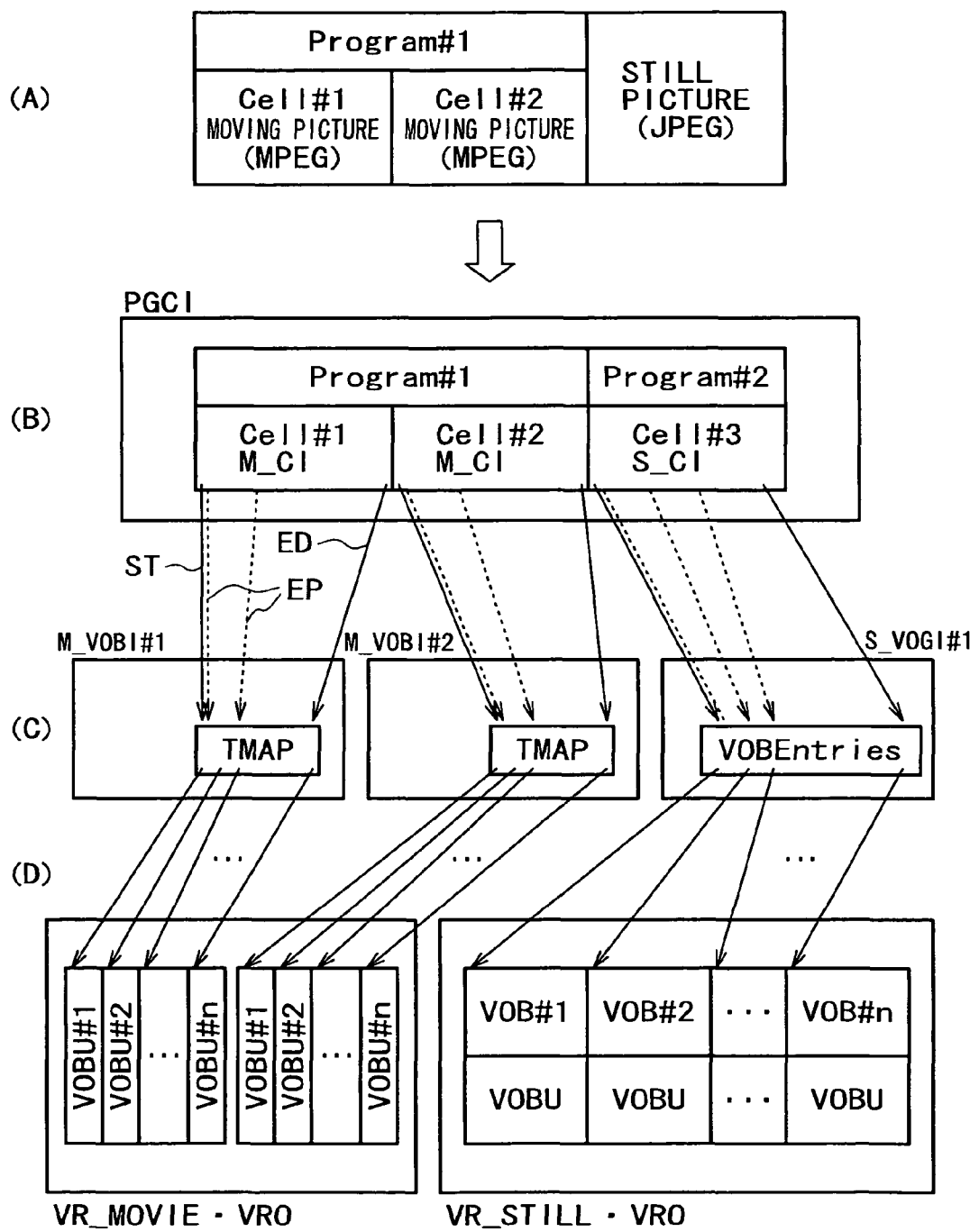
FIG. 5 is a diagram of assistance in explaining recorded states of data in the DVD Video Recording Format.

Description will next be made of the case of using the DVD Video Recording Format as a recording format. FIG. 5 is a diagram of assistance in explaining a case where still picture data compressed by the JPEG system and recorded in the digital still picture format on the DVD 100 is converted into MPEG I-pictures and the I-pictures after the conversion are recorded on the DVD in accordance with the DVD Video Recording Format.

As shown in FIG. 5(A), also in a case of recording moving picture data in the DVD Video Recording Format onto the DVD 100 used for recording, the DVD video camera according to the present embodiment can record the moving picture data in accordance with the DVD Video Recording Format, and compress still picture data by the JPEG system and record the still picture data in the digital moving picture format separately from the moving picture data.

That is, even in the case of using the DVD Video Recording Format, as in the case of the DVD Video Format described above, both the moving picture data and the still picture data can be recorded in a mixed manner in accordance with the respective recording formats.

An entry of Program#1 in FIG. 5(A) corresponds to VTS#1 in the above-described DVD Video Format, and represents a part comprising one title. Entries of Cell#1 and Cell#2 correspond to a CELL in a VOB of moving picture data in the above-described DVD Video Format, and correspond to a chapter, or one part (one section) of moving picture data comprising one title.

Thus, the DVD video camera according to the present embodiment can record moving picture data onto the DVD in accordance with the DVD Video Recording Format, and compress still picture data by the JPEG system and record the still picture data separately from the moving picture data.

In addition, even in the case of using the DVD Video Recording Format, when a still picture is taken, compressed by the JPEG system, and recorded onto the DVD 100 in the digital still picture format, the taken still picture is subjected to JPEG-I-picture conversion, an Entry Point is set to the I-picture, and then the I-picture is recorded onto the DVD 100 in accordance with the DVD Video Recording Format. The Entry Point indicates a position allowing a start of reproduction on a stream recorded on the DVD.

When moving picture data and still picture data are recorded in accordance with the DVD Video Recording Format, PGCI (ProGram Chain Information) is formed, as shown in FIG. 5(B). Cell#n in the PGCI in FIG. 5(B) represents an nth Cell in the PGCI.

There are two kinds of Cells in the DVD Video Recording Format: M_CI (Movie Cell Information) for moving picture data and S_CI (Still Picture Cell Information) for still picture data. It is specified that 999 M_CIs and 999 S_CIs can be present in the PGCI. In the case of FIG. 5(B), Cell#1 and Cell#2 are M_CIs, and Cell#3 is an S_CI.

Thus, in the case of FIG. 5(B), two titles (programs) Program#1 and Program#2 are recorded, and Program#1 is a title comprising two moving picture chapters Cell#1 and Cell#2. Program#2 is a title having Cell#3 of still picture data.

An M_CI has a pointer to M_VOBI (Movie VOB Information) shown in FIG. 5C, which has information for accessing a target VOBU (Video Object Unit), a reproduction start position ST, a reproduction end position ED, and a plurality of entry points EP in the M_VOBI as indicated by arrows connecting FIG. 5B with FIG. 5C. The entry points EP of the M_CI are referred to as M_C_EPI (Movie Cell Entry Point Information).

The M_C_EPI as the entry points of the M_CI indicates a given position on a TMAP (Time Map) included in the M_VOBI as an entry point. As shown by arrows connecting the M_VOBI in FIG. 4(C) with VOBUs in FIG. 4(D), the TMAP has a pointer to each VOBU in a VOB.

Thereby, in response to an instruction from the user, a reproduction position can be specified more accurately by for example specifying a title (program), a chapter, and a scene from which to perform reproduction.

An S_CI has a pointer to S_VOBI (Still VOB Information) shown in FIG. 4(C), which has information for accessing a target VOBU (Video Object Unit), a reproduction start position ST, a reproduction end position ED, and a plurality of entry points EP in the S_VOGI as indicated by arrows connecting FIG. 4(B) with FIG. 4(C). The entry points EP of the S_CI are referred to as S_C_EPI (Still Picture Cell Entry Point Information).

The S_C_EPI as the entry points of the S_CI indicates a given position of VOB Entries included in the S_VOGI (Still Picture Video Object Group Information) as an entry pointer. The VOB Entries indicates given VOBs in a still picture group (Still Picture Video Object Group (Still Group)).

As shown in FIG. 5(D), a VOB for recording a still picture includes one VOBU, and one I-picture is divided into a plurality of V_PCKs and stored in the VOBU. Sixty-four VOBs can be present in one S_VOGI.

The DVD video camera according to the present embodiment converts still picture data compressed by the JPEG system and recorded on the DVD into I-pictures of the MPEG system, adds the I-pictures to the Still Picture VOB Group shown in FIG. 5(D) in the DVD Video Recording Format described with reference to FIG. 5, and creates the S_VOGI shown in FIG. 5(C) and the Cell (S_CI) shown in FIG. 5(B) while creating entry points accordingly, in timing in which the control unit 20 determines that the processing is required, such for example as in timing of receiving an instruction from the user or in timing of receiving an instruction to remove the DVD from the DVD video camera according to the present embodiment.

Thus, the DVD video camera according to the present embodiment can record 999 (number of S_CIs)×64 (number of VOBs)=63936 still pictures. Therefore the number of recorded still pictures conventionally limited to the number of S_CIs (999 still pictures) by forming one still picture into one chapter can be increased 64-fold.

Referring to a flowchart of FIG. 6, description will next be made of processing in a case where still picture data compressed by the JPEG system and recorded on a DVD formatted in the DVD Video Recording Format is converted into I-pictures of the MPEG system and the I-pictures of the MPEG system are recorded in the DVD Video Recording Format.

Figure 6:
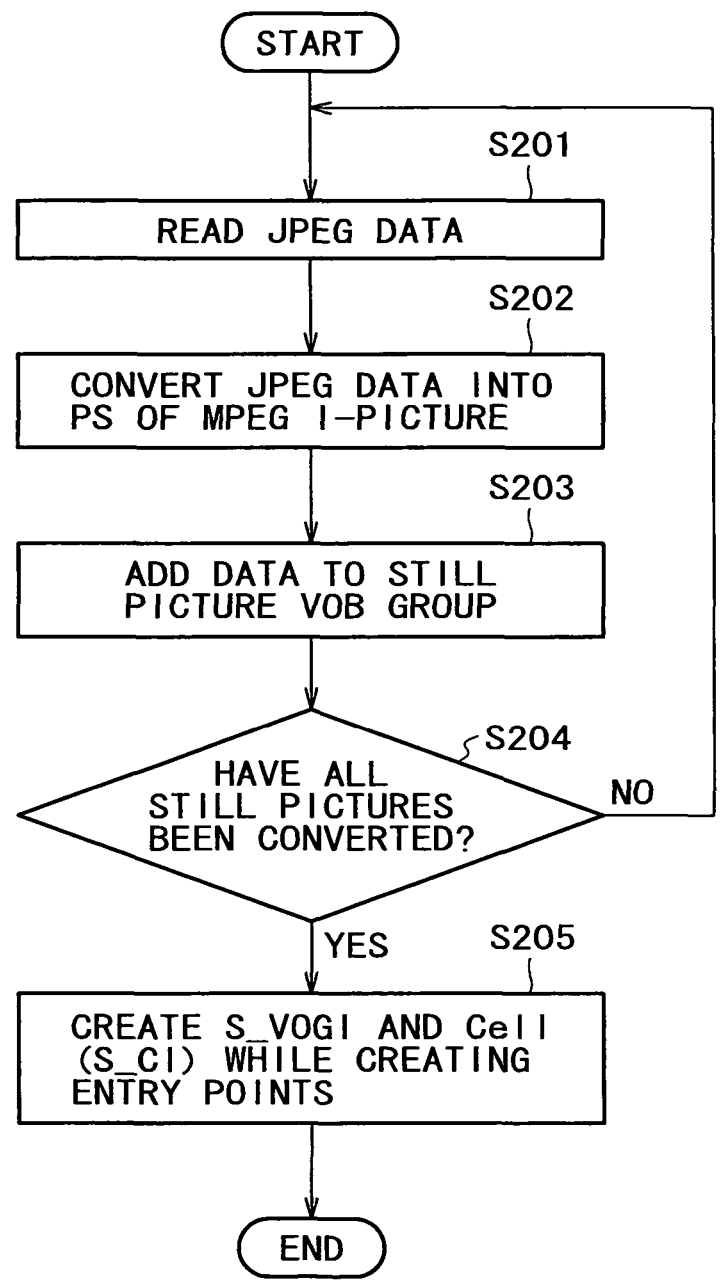
FIG. 6 is a flowchart of assistance in explaining processing in a case where still picture data is converted into I-pictures of the MPEG system and the I-pictures of the MPEG system are recorded in the DVD Video Recording Format.

As in the case of recording data in the DVD Video Format described with reference to FIG. 3, the processing shown in FIG. 6 is performed in timing in which so-called finalizing processing as performed in the above-described DVD Video Format is performed when there is an instruction from the user or when the DVD used for recording is removed from the DVD video camera, for example.

In this case, the control unit 20 controls the DVD rotation driving unit not shown in FIG. 1, the writing/reading unit 5, and the buffer memory 4 to read still picture data compressed by the JPEG system and recorded on the DVD 100 used for recording, and then supplies the still picture data to the format converting unit 7 (step S201).

Then, the control unit 20 controls the format converting unit 7 to convert the JPEG still picture data into data (PS: Program Stream) in the form of an I-picture of the MPEG system (step S202). The data is supplied to the format forming unit 3. Under control of the control unit 20, the format forming unit 3 adds the still picture data in the form of the I-picture of the MPEG system supplied thereto to a Still Picture VOB Group (FIG. 5(D)) as described with reference to FIG. 5, and then the still picture data is recorded onto the DVD via the buffer memory 4 and the writing/reading unit 5 (step S203).

The control unit 20 then determines whether all the JPEG still picture data recorded on the DVD used for recording has been converted into the form of an I-picture of the MPEG system, added to the Still Picture VOB Group, and recorded (step S204). When the control unit 20 determines in the determination processing of step S204 that not all the JPEG still picture data has been recorded, the control unit 20 controls parts as described above to repeat the processing from step S201.

When the control unit 20 determines in the determination processing of step S204 that conversion processing on all the JPEG still picture data has been completed, the control unit 20 creates an S_VOGI (FIG. 5(C)) and a Cell (S_CI) (FIG. 5(B)) while creating entry points taking into consideration contents of the newly added Still Picture VOB Group, adds the S_VOGI, and adds the Cell to a PGCI (step S205). Thereby the processing shown in FIG. 6 is ended.

Incidentally, display order of still pictures and display order of moving pictures and still pictures can be changed relatively easily by for example using an edit function of the DVD video camera according to the present embodiment and thereby changing the PGC and Cells through the key operating unit 25. Of course, the display order of still pictures and the display order of moving pictures and still pictures can also be changed relatively easily by for example using another DVD recording and reproducing apparatus having an edit function and thereby changing the PGC and Cells on the DVD 100 used for recording by the DVD video camera according to the present embodiment.

[Forms of Display of Pictures Recorded on DVD]

Description will next be made of forms of display of pictures when moving picture data and still picture data are reproduced from a DVD on which moving picture data compressed by the MPEG system, still picture data compressed by the JPEG system, and still picture data in the form of I-pictures of the MPEG system formed from the still picture data compressed by the JPEG system are recorded as described above.

FIGS. 7A and 7B are diagrams of assistance in explaining examples of screen display when desired picture data is selected in a case of reproduction of picture data recorded on the DVD loaded in the DVD video camera according to the present embodiment.

As shown by menu items MN1 and MN2 in FIGS. 7A and 7B, the DVD video camera according to the present embodiment allows selection of reproduction of moving pictures or reproduction of still pictures. When reproduction of moving pictures is selected, the DVD video camera according to the present embodiment reproduces the moving picture data compressed by the MPEG system and recorded in accordance with the DVD Video Format or the DVD Video Recording Format.

In this case, as shown in FIG. 7A, the control unit 20 of the DVD video camera according to the present embodiment provides for example five sub-screens on the LCD 12. On the five sub-screens, the control unit 20 for example displays a picture (thumbnail) at a start of each title (program) or a moving picture from a start of each title (program), and makes so-called slide show display in which the still picture data in the form of I-pictures of the MPEG system is displayed sequentially for a specified reproduction time.

FIG. 7A shows a case where a moving picture from a start of each title is displayed on sub-screens 12(1), 12(2), 12(3), and 12(4), and the slide show display based on the still picture data in the form of I-pictures of. the MPEG system is made on a sub-screen 12(5).

Then, by selecting a desired title (program), it is possible to display a moving picture from a start of the selected title (program) or make the slide show display based on the still picture data in the form of I-pictures of the MPEG system on the whole of a display screen of the LCD 12.

In this case, the still picture data in the form of I-pictures of the MPEG system is reproduced, and thus the still picture data compressed by the JPEG system does not need to be used at all.

Therefore, a DVD reproducing apparatus or a DVD recording and reproducing apparatus with only an MPEG decoder and without a JPEG decoder can use still picture data in the form of I-pictures of the MPEG system. That is, even still picture data originally recorded on the DVD by the JPEG system can be used through still picture data obtained by converting the recording format of the still picture data.

When reproduction of still pictures is selected in the DVD video camera according to the present embodiment, the DVD video camera according to the present embodiment reproduces the still picture data compressed by the JPEG system and recorded.

Also in this case, as shown in FIG. 7B, the control unit 20 of the DVD video camera according to the present embodiment provides for example six sub-screens on the LCD 12. On the six sub-screens, the control unit 20 displays individual still pictures on the basis of the still picture data compressed by the JPEG system.

Specifically, as shown in FIG. 7B, individual still pictures based on the still picture data compressed by the JPEG system and recorded are displayed on respective sub-screens 12(1) to 12(6). Then, by selecting a desired still picture, it is possible to display the still picture data on the whole of the display screen of the LCD 12 in a higher resolution than that of a still picture based on still picture data in the form of an I-picture of the MPEG system.

In this case, the still picture data compressed by the JPEG system is reproduced, and thus the picture data (moving picture data and still picture data) compressed by the MPEG system does not need to be used at all.

Therefore, a DVD reproducing apparatus or a DVD recording and reproducing apparatus with only a JPEG decoder and without an MPEG decoder can use the still picture data compressed by the JPEG system.

Figure 8:
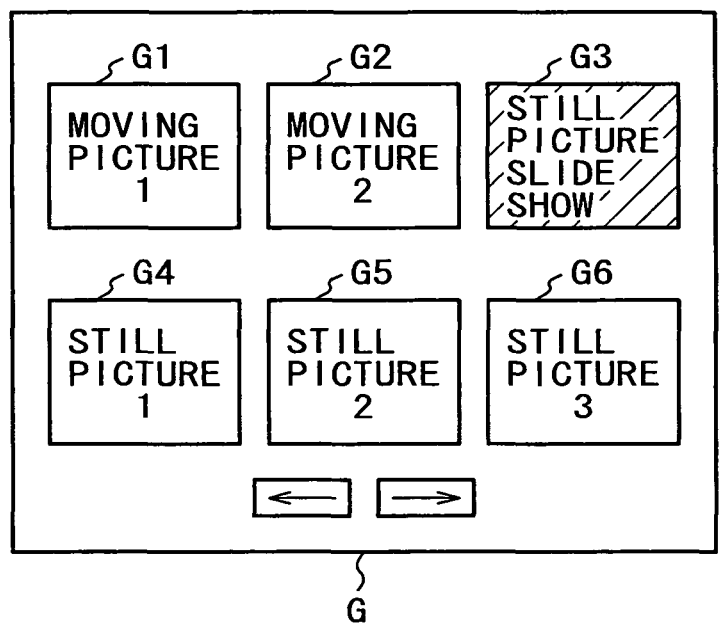
FIG. 8 is a diagram of assistance in explaining an example of screen display when desired picture data is selected.

An apparatus having both an MPEG decoder and a JPEG decoder such as the DVD video camera according to the present embodiment, for example, can use each of the moving picture data compressed by the MPEG system and recorded in the DVD Video Format or the DVD Video Recording Format, the still picture data in the form of I-pictures of the MPEG system, and the still picture data compressed by the JPEG system, and display a picture corresponding to each of the pieces of data, as shown in FIG. 8, for example.

Also in the example of FIG. 8, six sub-screens G1 to G6 are shown provided on a display screen G. The sub-screens G1 and G2 display pictures corresponding to the moving picture data compressed by the MPEG system and recorded in the DVD Video Format or the DVD Video Recording Format. The sub-screen G3 makes slide show display on the basis of the still picture data in the form of I-pictures of the MPEG system. The sub-screens G4, G5, and G6 display pictures corresponding to the still picture data compressed by the JPEG system.

When one of the sub-screens G1 and G2 is selected, a moving picture based on the selected moving picture data can be displayed on the whole of the display screen G. When the sub-screen G3 is selected, slide show display based on the still picture data in the form of I-pictures of the MPEG system can be made on the whole of the display screen G.

When one of the sub-screens G4, G5, and G6 is selected, the selected still picture data can be displayed on the whole of the display screen G in a higher resolution than that of still pictures based on the still picture data in the form of I-pictures of the MPEG system.

It is to be noted that six sub-screens are provided on one screen in the display examples of FIGS. 7A and 7B and FIG. 8; however, the present invention is not limited to this. Sub-screens corresponding in number to size of the display screen can be provided, and pictures can be displayed in various forms to select desired data and reproduce and use the selected data.

Thus, the DVD video camera according to the present embodiment can record moving pictures and still pictures in a mixed manner. In addition, the DVD video camera according to the present embodiment can retain the originally recorded still picture data as it is, and convert the still picture data into data in the same compression system and the same recording format as the moving pictures and then rerecord the data.

In this case, since the still picture data is not recorded in a special form such for example as MPEG Private Packets, a standard decoder (a standard MPEG decoder in the case of the above-described embodiment) can be utilized to use both the moving picture data and the still picture data recorded as still pictures without using a special decoder.

In addition, the still picture data can be used without a decoder used only for still pictures (JPEG decoder in the case of the above-described embodiment). Moreover, since the original still picture data compressed by a compression format exclusively for still picture data remains, the still picture data can be used with high quality.

Further, as for still picture data in the form of an I-picture of the MPEG system which data is recorded in the DVD Video Format or the DVD Video Recording Format, a reproduction position of the still picture data can be changed to an arbitrary position by modifying VTSI information or PGCI and Cell information, whereby the variety of editing can be increased.

Specifically, a reproduction position on an MPEG stream, a reproduction time of a still picture within the MPEG stream, or the like can be changed freely to create original contents, by changing a title number, a program number, a chapter number, a Cell Still Time or the like using an edit function of the DVD video camera according to the present embodiment or another DVD recording and reproducing apparatus.

It is to be noted that while in the foregoing embodiment, still picture data in the form of I-pictures of the MPEG system is added after a last VTS or Program of moving picture data, the present invention is not limited to this. When the DVD Video Recording Format is used, the still picture data can be recorded so as to be inserted between pieces of recorded data.

Also, while the foregoing embodiment has been described by taking as an example a case where the MPEG system is used as a system for compressing moving picture data and the JPEG system is used as a system for compressing still picture data, the present invention is not limited to this. Various systems such as MPEG2, MPEG4 and the like even in the case of the MPEG system can be used as a system for compressing moving picture data. In addition, other compression systems for moving picture data with a concept of data that can be treated as a still picture such as an I-picture may of course be used. As for still picture data, it is needless to say that still picture data may be recorded in for example the DCF format used in digital cameras, and compression systems other than the JPEG system may be used, of course. The present invention is also applicable when still picture data is recorded by systems not involving compression such as a bitmap format or the like.

That is, there is no limitation on data compression systems. The present invention is applicable to cases where moving picture data and still picture data are recorded by different recording systems. Even when data compression is not performed, the present invention is applicable to cases where moving picture data and still picture data are recorded by different recording systems.

Further, the control unit 20 can inform the user through the LCD or the like of the number of still pictures that can be taken in consideration of an amount of still picture data to be recorded in a digital moving picture format. In this case, an amount of data recorded in the digital moving picture format and an amount of data recorded in the digital still picture format are added together to calculate an amount of data recorded and calculate a remaining recording space. on the DVD. On the basis of this remaining space, the number of still pictures that can be taken is calculated in consideration of an amount of still picture data to be rerecorded in the digital moving picture format.

Further, when still pictures are taken and recorded, resolution can be changed for each still picture, for example. Specifically, it is possible to record a still picture in a still higher resolution than the resolution of standard still pictures and later convert the still picture into the form of an I-picture of the MPEG system as described above.

Further, while the DVD is used as a recording medium in the foregoing embodiment, the present invention is not limited to this. The present invention is applicable to recording apparatus using other optical disks, magneto-optical disks, magnetic disks such as hard disks and the like, semiconductor memories and the like as a recording medium. Of course, the present invention is applicable to recording apparatus capable of using two or more different recording media, for example a disk recording medium and a semiconductor memory.

It is needless to say that the present invention is applicable to simple recording apparatus without a camera unit.

Further, while the DVD Video Format and the DVD Video Recording Format can be selected and used as a recording format in the embodiment described above, support may of course be provided for only one of the formats, or support can of course be provided for other recording formats.

As described above, according to the present invention, it is possible to record moving picture data and still picture data in a form reproducible by various reproducing apparatus without a special decoder for still picture data.

Since still picture data can be recorded also in a form reproducible with a high resolution, still pictures of the high resolution can be used at any time as required by using a special decoder for still picture data.

The invention claimed is:

1. A recording apparatus comprising:

reading means for reading, in predetermined timing, one or more pieces of digital still picture data recorded in a digital still picture format on a predetermined recording medium;

converting means for performing converting processing of converting the one or more pieces of said digital still picture data from said reading means into converted data for recording in accordance with a digital moving picture format to combine the one or more pieces of said digital still picture data, wherein the converting processing is performed during a period, which is between the timing of receiving an instruction from a user to perform finalizing processing or to remove the recording medium from recording system, and the timing of performing the finalizing processing, the finalizing processing being performed to form and update managing information for managing the converted data;

recording means for recording said converted data formed by said converting means onto said recording medium; and controlling means for informing the user of the number of the digital still pictures capable of being taken, wherein the number of the digital still pictures capable of being taken is calculated in consideration of an amount of the digital still picture data to be recorded in a digital moving picture format, on basis of a remaining recording space on the recording medium, wherein the remaining recording space is calculated based on an amount of recorded data which is calculated by adding together an amount of data recorded in the digital moving picture format and an amount of data recorded in the digital still picture format, and wherein a reproduction position of the digital still picture data in the form of an I-picture of a MPEG system is changed to an arbitrary position by modifying VTIS information or PGCI and Cell information.

2. A recording apparatus as claimed in claim 1, wherein:
when one or both of digital moving picture data in said digital moving picture format and digital still picture data in said digital still picture format are recorded on said recording medium, said recording means records said converted data onto said recording medium so as not to destroy the previously recorded data.

3. A recording apparatus as claimed in claim 1, further comprising:
receiving means for receiving an input of information specifying a form of reproduction of one or more still pictures converted into data for recording in accordance with said digital moving picture format and recorded on said recording medium; and
changing means for changing information on reproduction of the one or more said still pictures converted into the data for recording in accordance with said digital moving picture format and recorded on said recording medium on a basis of the information received via said receiving means.

4. A recording apparatus as claimed in claim 1, further comprising:
a camera unit configured to take a moving picture and a still picture and outputting the taken moving picture and the taken still picture as digital data;
moving picture converting means for converting digital moving picture data from said camera unit into said digital moving picture format; and
still picture converting means for converting digital still picture data from said camera unit into still picture data in said digital still picture format;
wherein said recording means records moving picture data in said digital moving picture format from said moving picture converting means and said still picture data in said digital still picture format from said still picture converting means onto said recording medium.

5. A recording method comprising:
a reading step of reading, in predetermined timing, one or more pieces of digital still picture data recorded in a digital still picture format on a predetermined recording medium;
a converting step of converting the read one or more pieces of said digital still picture data into converted data for recording in accordance with a digital moving picture format to combine the one or more pieces of said digital still picture data,
wherein the converting step is performed during a period, which is between the timing of receiving an instruction from a user to perform finalizing processing or to remove the recording medium from recording system, and the timing of performing the finalizing processing, the finalizing processing being performed to form and update managing information for managing the converted data;

a recording step of recording said converted data onto said recording medium; and
a controlling step of informing the user of the number of the digital still pictures capable of being taken,
wherein the number of the digital still pictures capable of being taken is calculated in consideration of an amount of the digital still picture data to be recorded in a digital moving picture format, on basis of a remaining recording space on the recording medium,
wherein the remaining recording space is calculated based on an amount of recorded data which is calculated by adding together an amount of data recorded in the digital moving picture format and an amount of data recorded in the digital still picture format, and
wherein a reproduction position of the digital still picture data in the form of an I-picture of a MPEG system is changed to an arbitrary position by modifying VTIS information or PGCI and Cell information.

6. A recording method as claimed in claim 5, wherein:
in said recording step, when one or both of digital moving picture data in said digital moving picture format and digital still picture data in said digital still picture format are recorded on said recording medium, said converted data is recorded onto said recording medium so as not to destroy the previously recorded data.

7. A recording method as claimed in claim 5, further comprising:
a receiving step of receiving an input of information specifying a form of reproduction of one or more still pictures converted into data for recording in accordance with said digital moving picture format and recorded on said recording medium; and
a changing step of changing information on reproduction of the one or more said still pictures converted into the data for recording in accordance with said digital moving picture format and recorded on said recording medium on a basis of the information received in said receiving step.

8. A recording method as claimed in claim 5, further comprising:
a taking step of taking one of a moving picture and a still picture and outputting one of the taken moving picture and the taken still picture as digital data;
a moving picture converting step of converting digital moving picture data of the moving picture taken in said taking step into moving picture data in said digital moving picture format;
a still picture converting step of converting digital still picture data of the still picture taken in said taking step into still picture data in said digital still picture format; and
a taken data recording step of recording one of said moving picture data formed in said moving picture converting step and said still picture data formed in said still picture converting step onto said recording medium.

* * * * *